May 22, 1945. R. C. COLE 2,376,328
PURIFICATION OF HYDROFLUORIC ACID
Filed May 15, 1943
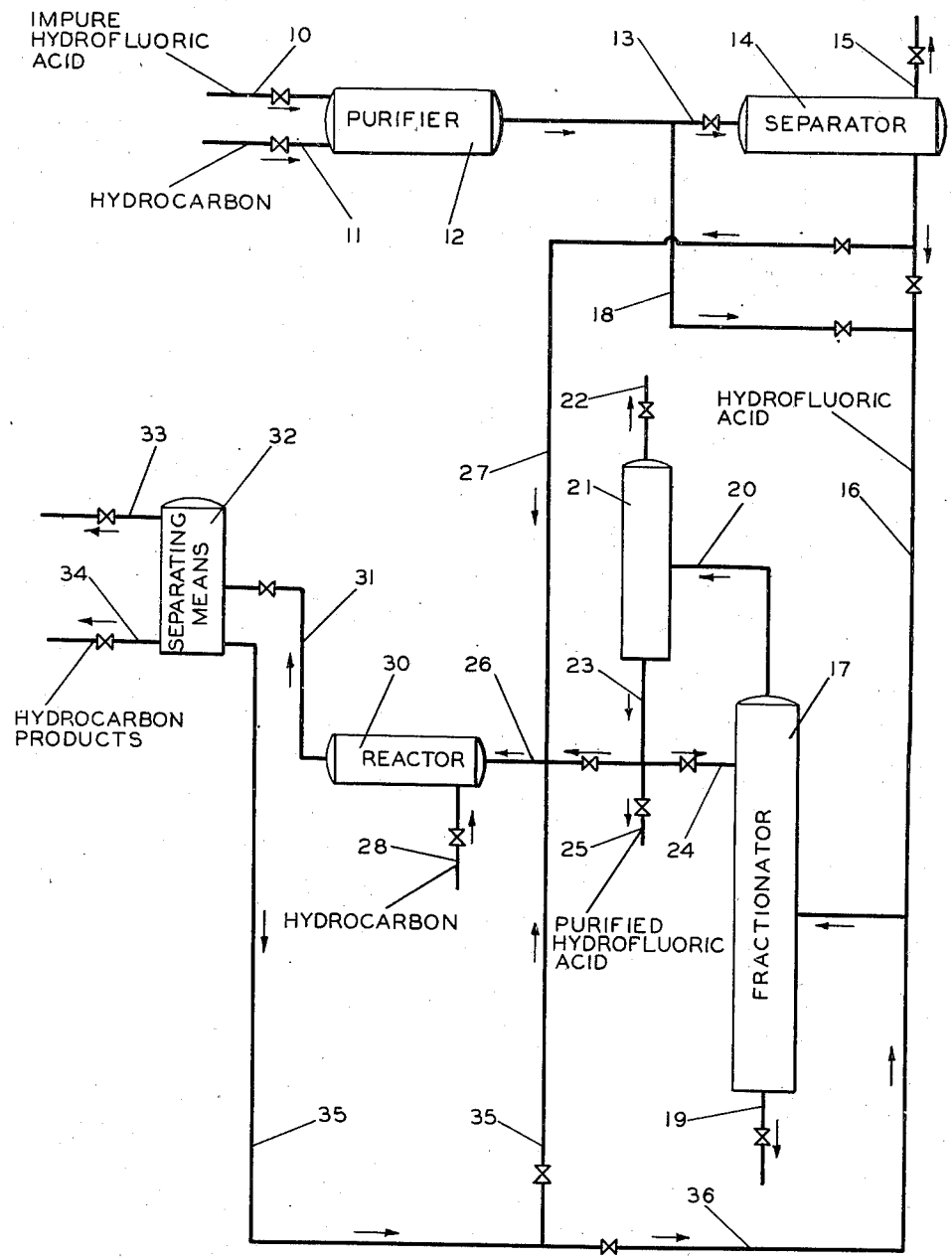
INVENTOR
R. C. COLE
BY *Hudson, Young & Yinger*
ATTORNEYS Patented May 22, 1945

2,376,328

UNITED STATES PATENT OFFICE 2,376,328

PURIFICATION OF HYDROFLUORIC ACID

Ralph C. Cole, Bartlesville, Okla., assignor to Phillips Petroleum Company, a corporation of Delaware Application May 15, 1943, Serial No. 487,144

3 Claims. (Cl. 260—683.4)

This invention relates to a process of purification of hydrofluoric acid, more particularly to the removal of sulfur dioxide.

Hydrofluoric acid, especially in a concentrated or anhydrous form, is an exceedingly useful catalyst for effecting various conversions of organic compounds, among which are alkylation of alkylatable organic compounds, especially aromatic hydrocarbon and non-hydrocarbon compounds and of paraffinic hydrocarbons, with olefins or other alkylating reactants, such as alcohols, esters, alkyl halides, ethers, etc., polymerization of olefins, and reconstruction, isomerization, and/or disproportionation of hydrocarbons. As commercially prepared by the action of concentrated sulfuric acid on fluorspar or fluorite or similar minerals, however, it always contains a small proportion of sulfur dioxide, which in the best grade of commercial anhydrous hydrofluoric acid usually is not more than 0.1 per cent by weight, but sometimes is of the order of 0.5 to 1 per cent or more. The presence of this sulfur dioxide is troublesome and deleterious, since the sulfur becomes concentrated in the product of the catalytic conversion, thereby increasing the corrosiveness of the product, decreasing the octane number and/or lead response of the product (if a motor fuel), and necessitating a considerable expense for desulfurization of the product. For example, it has been repeatedly observed that the product of the alkylation of isobutane with olefins in the presence of a fresh batch of hydrofluoric acid is sour to doctor solution and at times contains enough sulfur to liberate readily detectable proportions of hydrogen sulfide, or even elementary sulfur, when it is distilled, in spite of the fact that comparatively negligible amounts of sulfur, or no sulfur, was present in the original hydrocarbon feed stocks. The appearance of excessively high proportions of sulfur in the alkylate has been traced to sulfur dioxide present as an impurity in the hydrofluoric acid used as catalyst.

An object of this invention is to free hydrofluoric acid from sulfur dioxide. Another object is to provide a process for removing sulfur dioxide from hydrofluoric acid containing it by converting it to relatively high-boiling organic sulfur compounds. Other objects and advantages of this invention will be apparent from the accompanying description and drawing.

In accordance with one embodiment of this invention, hydrofluoric acid containing sulfur dioxide as an impurity is contacted with a hydrocarbon material under such circumstances that the sulfur dioxide is removed. This is more readily effected when the sulfur dioxide is converted to relatively high-boiling organic sulfur compounds. Although under some conditions the hydrocarbon material used may be completely saturated, it is preferably at least partly unsaturated, and it may be even completely unsaturated. Only a limited amount of the hydrocarbon material is usually adequate, but the amount that is necessary in any particular case depends, at least in part, upon the content of sulfur dioxide. When sufficient hydrocarbon is used to form a separate hydrocarbon liquid phase, this phase is separated from the hydrofluoric acid liquid phase, and the acid phase is fractionally distilled to separate the acid from the higher-boiling hydrocarbons, organic fluorine compounds, and organic sulfur compounds dissolved in it. The resulting hydrofluoric acid is free from sulfur dioxide; it is in excellent condition for use as a catalyst for the conversion of hydrocarbons, as for example for the alkylation of an isoparaffin with one or more olefins. The limited amount of hydrocarbon liquid phase that may be obtained is disposed of in any desired manner; for example, it may be burned as fuel, or it may be subjected to a treatment in which it is desulfurized by contact with a desulfurizing agent and is fractionally distilled to obtain desulfurized hydrocarbons. The hydrofluoric acid may be either in the gaseous or liquid state, preferably liquid, and when so treated is preferably highly concentrated, and may even be substantially anhydrous. It is desirable, and possible, to remove the sulfur dioxide by my invention so that it cannot be detected in the resulting purified hydrofluoric acid by ordinary analytical methods, that is, to a concentration not greater than about 0.0001 per cent by weight of the hydrofluoric acid. Although I am not certain as to the exact mechanism by which the sulfur dioxide is removed, it may be removed, at least in part, by physical solution, especially when a highly aromatic liquid hydrocarbon material is used, and when the hydrocarbon material comprises an olefin it appears that some reaction takes place by which an organic sulfur-containing compound is formed.

My invention will now be described in connection with the accompanying drawing which shows, schematically, apparatus in which a preferred manner of practicing my invention may be carried out.

Impure hydrofluoric acid such as the present commercially available anhydrous hydrofluoric acid containing about 0.1 per cent of sulfur dioxide is passed through line 10 to purifier 12. A suitable hydrocarbon material is also passed to purifier 12 through line 11. Although, as previously discussed, the purification may be conducted so that the sulfur dioxide is removed primarily by selective solvent action, it is preferred that the hydrocarbon material passed through line 11 contain some olefinic hydrocarbons or similar unsaturated hydrocarbons which will react with the sulfur dioxide to form organic sulfur-containing compounds. At times this hydrocarbon material is most conveniently an alkylation feed stock such as a mixture comprising an alkylatable hydrocarbon and an olefin, or at least an olefin-containing stock which is one of two or more stocks to be charged to an alkylation process since it is not necessary in this step to have the mol ratio of alkylatable hydrocarbon to olefin as high as in the total charge to an alkylation step. Either or both of the hydrofluoric acid and hydrocarbon material may be in the gas phase, but operations and the purification itself will generally be greatly facilitated by having both materials in liquid phase. In the latter case the quantity of the hydrocarbon material may be quite limited, such as 1–20 per cent of the acid by liquid volume, and in many cases the amount may be so small that it is completely dissolved in the hydrofluoric acid. In cases in which rather high contents of sulfur dioxide are present it may be most desirable to have a sufficient amount of liquid hydrocarbon material present to form a separate liquid phase in which case the two liquid phases may be more or less equal in volume. As will be readily appreciated by one skilled in the art the actual conditions necessary in any particular case can be readily determined by a small scale trial. For the sake of concreteness the hydrocarbon material may be taken to be a $C_4$ refinery fraction approximately half of which consists of isobutane and butylenes in a mol ratio of about 1:2.

In purifier 12 the hydrofluoric acid and the hydrocarbon material are intimately mixed together for a period of time sufficient to effect the desired treatment of the sulfur dioxide. In the case of the $C_4$ refinery mixture just mentioned the conditions of temperature, pressure, and contact time may be substantially similar to those ordinarily used to effect alkylation in the presence of liquid hydrofluoric acid, but it will be understood that although some alkylation may also occur, the purpose of the present step is purification of the impure hydrofluoric acid introduced through line 10. In Frey Patent 2,317,901, granted April 27, 1943, such alkylation conditions are stated to be temperatures between about 0 and 300 or 400° F., with temperatures no higher than about 100° F. for alkylating isoparaffins, pressures varying from only slight superatmospheric pressures up to 1,000 or 2,000 pounds per square inch or more, generally sufficient to maintain liquid phase, and reaction periods from as low as 5 minuutes to as high as 2 to 4 or 5 hours. The resulting mixture may be passed through line 13 to separator 14. The bulk of the hydrocarbon material is separated and removed through line 15 and the treated hydrofluoric acid is removed through line 16 and may be passed to fractionator 17. The separation in separator 14 may be one of separation of two liquid phases as is known to the art. When only small amouts of hydrocarbon materials, and organic sulfur compounds produced, as herein described, in purifier 12, are present in the mixture passing through line 13 this mixture may be passed through line 18 to line 16 and fractionator 17, separator 14 being eliminated from the process. In fractionator 17 the treated hydrofluoric acid is subjected to fractional distillation, the purified acid being passed as an overhead product through line 20 to accumulator 21 and a mixture comprising relatively higher boiling hydrocarbons and the sulfur from the original sulfur dioxide in the form of organic sulfur compounds is withdrawn as a kettle product through line 19. The sulfur content of this kettle product is generally well in excess of 1 per cent by weight and is sometimes several per cent. With the aid of suitable cooling equipment not shown the purified hydrofluoric acid is cooled in accumulator 21 as a liquid and may be withdrawn through line 23 and recovered for any desired use through line 25. Generally a portion thereof is returned to fractionator 17 through line 24 as a liquid reflux. Any light gases which may be present can be removed through line 22.

As is discussed elsewhere herein, the hydrofluoric acid which is so purified is an improved catalyst for many reactions. It may be utilized as such by being passed through line 26 to a reactor 30. Material to be catalytically reacted such as an olefin-paraffin mixture suitable for alkylation is, in such a case, introduced to reactor 30 through line 28. Effluents of the reactor 30 are passed through line 31 to separating means 32. Hydrocarbon products may be recovered through line 34. Lower boiling material which may comprise unreacted hydrocarbons may be recovered through line 33. Used hydrofluoric acid may be separated through line 35 and returned to reactor 30. Any desirable portion of this used hydrofluoric acid may be passed from line 35 through line 36 to line 16 and fractionator 17 for further purification and removal of high boiling organic compounds which may be contained therein.

When the acid layer obtained in separator 14 contains relatively little sulfur, as when there is a sufficient hydrocarbon layer to carry away a large proportion of the sulfur, some or all of this acid may be passed directly to reactor 30 from line 16 through lines 27 and 26.

It will be understood that the drawing is purely schematic and that it does not specifically show many valves, pumps, heat exchangers, and the like devices that may be convenient or even necessary for the operations that have been indicated. As such devices are well-known, they may be incorporated as desired or necessary by those skilled in the art.

Some aspects of the invention are further illustrated by the following example, which should not be used to restrict the invention unduly.

*Example*

Shortly after a commercial plant for the hydrofluoric acid alkylation of isobutane with olefins, principally butylenes, was placed into operation, it was found that the alkylate contained 0.0253 per cent sulfur by weight, was sour to doctor solution, and had a relatively poor lead response. The total hydrocarbon feed to the alkylation unit had the following composition, in per cent by liquid volume:

| | |
|---|---:|
| Propane | 10.8 |
| Isobutane | 33.9 |
| Butylenes and propylene | 5.1 |
| Normal butane | 50.1 |
| Pentane | 0.1 |
| Total | 100.0 |

This feed contained only 0.0005 per cent by weight of sulfur. The residence time of the hydrocarbon phase in the alkylation zone was 10 minutes. The temperature was 90° F. The ratio of hydrofluoric acid to hydrocarbons in the reactor was approximately 1:1 by volume. The composition of the commercial hydrofluoric acid used as catalyst is indicated by the following typical analysis, in per cent by weight:

| | |
|---|---|
| Hydrogen fluoride | 98.7 |
| Sulfur dioxide | 0.070 |
| Fluosilicic acid | 0.28 |
| Sulfuric acid | 0.008 |
| Water | 0.25 |
| Unaccounted for | 0.692 |
| | 100.000 |

In contrast, when the catalyst is preliminarily freed from sulfur dioxide by contacting with approximately its own volume of the alklation feed for approximately half an hour and by being distilled, and the resulting hydrocarbon material is discarded, in accordance with the present invention, the alkylate is sweet to doctor solution and usually contains less than about 0.005 per cent of sulfur; and the lead response of the alkylate is comparatively much better.

The invention may be practiced otherwise than as specifically indicated herein, and many minor modifications and variations within the scope and spirit of it will be obvious to those skilled in the art, in the light of the present disclosure and discussion.

I claim:

1. In a process for effecting the conversion of an organic compound in the presence of concentrated hydrofluoric acid as a conversion catalyst, the improvement for avoiding contamination of products of said conversion by sulfur compounds resulting from sulfur dioxide present as an impurity in make-up hydrofluoric acid catalyst, which comprises separating from effluents of said conversion liquid hydrofluoric acid catalyst, recycling a portion of said liquid hydrofluoric acid catalyst to said conversion, passing a further portion of said hydrofluoric acid to a fractional distillation means to remove impurities therefrom, admixing olefin hydrocarbons with sulfur dioxide-contaminated liquid hydrofluoric acid from an extraneous source and maintaining said mixture under reaction conditions to convert said sulfur dioxide to organic sulfur compounds, passing liquid hydrofluoric acid resulting from said treatment and containing resulting organic sulfur compounds to the aforesaid fractional distillation means, removing as a low-boiling fraction from said fractional distillation means substantially pure sulfur-free hydrofluoric acid and passing same to said conversion.

2. A process for alklating alkylatable hydrocarbons with olefins in the presence of concentrated hydrofluoric acid and avoiding contamination of the alkylate by sulfur compounds resulting from sulfur dioxide present as an impurity in make-up hydrofluoric acid catalyst, which comprises reacting an alkylatable hydrocarbon and an olefin under alkylation conditions in the presence of essentially sulfur-free hydrofluoric acid as alkylation catalyst, separating from effluents of said alkylation liquid hydrofluoric acid catalyst, recycling a portion of said liquid hydrofluoric acid catalyst to said alkylation, passing a further portion of said hydrofluoric acid to a fractional distillation means to remove impurities therefrom, admixing olefin hydrocarbons with sulfur dioxide-contaminated liquid hydrofluoric acid from an extraneous source and maintaining said mixture under reaction conditions to convert said sulfur dioxide to organic sulfur compounds, passing liquid hydrofluoric acid resulting from said treatment and containing resulting organic sulfur compounds to the aforesaid fractional distillation means, removing as a low-boiling fraction from said distillation means substantially pure sulfur-free hydrofluoric acid and passing same to said alkylation.

3. The process of claim 2 in which said alkylatable hydrocarbon is a low-boiling isoparaffin.

RALPH C. COLE.